UNITED STATES PATENT OFFICE.

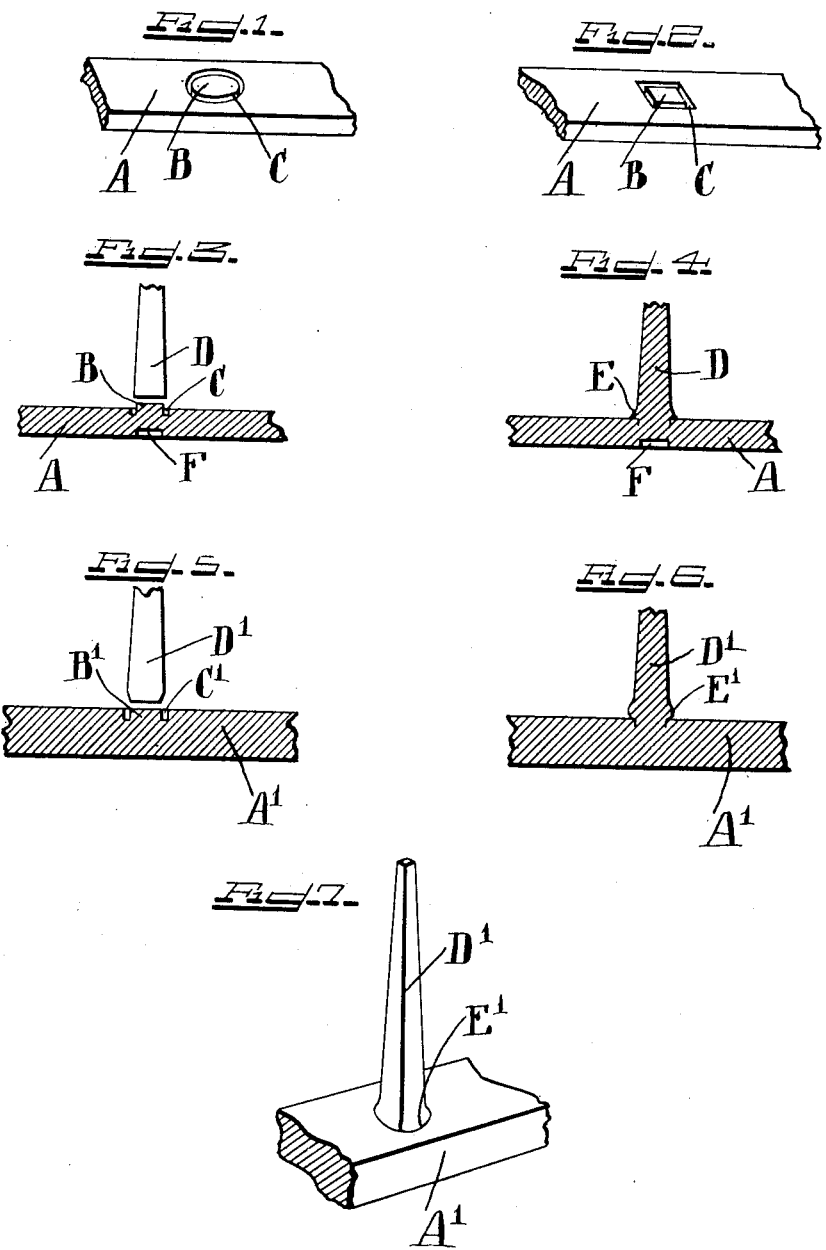

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

PROCESS OF ELECTRIC WELDING.

945,555.

Specification of Letters Patent.

Patented Jan. 4, 1910.

Application filed March 3, 1908. Serial No. 418,950.

*To all whom it may concern:*

Be it known that I, MAURICE LACHMAN, a citizen of the United States, residing in the city of New York, county of New York, and State of New York, have invented certain new and useful Processes of Electric Welding; and I do hereby declare the following to be a full, clear, and exact description of the same, such as will enable others skilled in the art to which it appertains to make and use the same.

This invention relates to processes of electrical welding and consists in a method of electrically welding rods, teeth, tines and similar elongated metal objects to plane surfaced metal objects, which comprises the provision upon such plane surfaced objects of a lug or projection of cross sectional area about corresponding to that of the other element to be welded thereto, placing such element and such lug in abutting contact, passing a welding current through such contact and simultaneously pressing the metal objects together until coalescence and integral union occur at such contact, and finally discontinuing the welding current; all as more fully hereinafter set forth and claimed.

The present invention is particularly applicable to welding the butt ends of rods, teeth, tines and similar elongated objects to plane surfaced metal objects of relatively large surface area and thickness, as compared with the cross sectional area of the elongated objects to be welded thereto.

In the present invention, the holding element, as, for instance, the back of a rake, is broader than the end of the tine to be welded thereto, and for this reason, the relatively broad surface on the back of the rake, to which the tine is to be welded, is provided with a spur or lug either projecting from its surface or countersunk therein, depending upon the relative thickness of the back of the rake, for when the back of the rake is very thick it is impracticable to form lugs which project above the surface of the metal.

According to the present invention the spurs or lugs on the back of the rake, for example, can be made by a suitable die or press which will form a continuous groove on the relatively broad surface of the back of the rake, so as to form an isolated surface of metal or lug to which the end of the tine is to be welded, the number of isolated surfaces or lugs depending upon the number of tines which are to be welded to the back of the rake or other article. The relative cross-sectional area of the isolated surface or lug may be varied by varying the shape and depth of the continuous groove, which may be round, square or of different shapes as desired, depending largely upon the cross-sectional area of the end of the tine, which is preferably of about the same cross sectional area as the isolated surface or lug so that when the back of the rake, and the tines are put in a suitable machine and a welding current of electricity is passed through the same, the isolated surface or lug and the end of the tine will be heated equally and a coalescent and integral union can readily be effected, after which the welding current is cut off. Before the metal has cooled at the point of weld union the same is preferably upset so as the metal will fill the continuous groove and also form a continuous flange which bears upon the top of the back of the rake, thereby stiffening the tines, the bur, if any, being pressed into the continuous groove so as to leave a neat welded joint at the point of welded union.

Referring to the drawings: Figure 1 is a perspective view of a portion of the back of a rake, showing one form of isolated contact surface; Fig. 2 is a view similar to Fig. 1, showing an alternative form of isolated contact surface; Fig. 3 is a detail view of the back of the rake in cross-section, showing the isolated contact surface projecting above the surface of the back of the rake. The figure also shows a tine spaced above the isolated contact surface; Fig. 4 is a detail view in cross section showing the tine welded to the back of the rake; Fig. 5 is a view similar to Fig. 3, in which the isolated contact surface is level with the surface of the back of the rake. The figure also shows an alternate form of tine; Fig. 6 is a view similar to Fig. 5, showing in cross section the tine welded to the back of the rake; Fig. 7 is a perspective view of a tine, welded to the flat surface of the back of a piece of relatively thick metal.

In the drawings A designates a portion of the back of a rake which is provided with isolated surfaces or lugs B made by forming continuous grooves C on the surface of the back A by means of a suitable die. The relative cross-sectional area of the isolated surfaces or lugs may be varied by varying the shape of the grooves C which may be round or square, as shown in Figs. 1 and 2, or any other shape as desired, depending largely upon the shape of the end of the tines D, which are to be welded thereto.

The isolated surfaces or lugs B are of such a cross sectional area, and the grooves C are of such a depth, that when a current of electricity is passed through the back of the rake A, the isolated surface B and the end of the tine D will be heated to substantially the same temperature. After the end of the tine D and isolated surface B have been heated to a welding temperature, the same are forced together to complete the weld, the same being forced together so that the welded metal will be upset at the point of welded union so as to entirely close the continuous groove C, the same being not necessarily welded together, although the outward appearance of the welded union does not disclose the groove C, as the isolated surface B and the end of the tine D are upset to fill the groove C while the lower end of the tine D is also upset so as to form an upset portion or continuous flange E, which bears upon the top of the rake and assists in materially stiffening the tines D while at the same time giving a finished appearance to the welded union, as shown in Fig. 7.

If the metal A is of relatively thin metal, the lug B can be forced above the surface of the metal as shown in Fig. 3, by means of a suitable die or punch so as to leave a countersunk recess F which is preferably of the same shape as the isolated surface B. By so doing it will be seen that there is very little metal connecting the isolated surface B with the back of the rake A which prevents the heat being carried away by conduction and facilitates the isolated surface B being brought to a welding temperature simultaneously with the end of the tine D when a welding current is passed through the same. By providing the recess F it will also be seen that the groove C can be of less depth than would otherwise be the case. When the back of the rake A' is made of relatively thick metal, only the grooves C' are used as shown in Fig. 5, the grooves being made of sufficient depth to heat the isolated surface B' and the end of the tine D' to approximately the same temperature when a welding current is passed through the same.

By referring to Figs. 3 and 5, it will be seen that the end of the tines are preferably a little larger in cross section than the corresponding surfaces to which they are to be welded, although they are not so large as to come in contact with the back of the rake adjacent the isolated surfaces until the same have been welded together and upset so as to close the grooves and form a flange about the end of the tines.

In order to insure a suitable flange forming about the base of the tine, when the same has been welded to the back of a rake, the tine D' is preferably made of a little greater cross sectional area near its lower end and sharpened as shown in Fig. 5, so as to be of approximately the same cross-sectional area as the isolated surface B so that when the same have been welded together there is abundant metal at the base of the tine D' to form an excellent flange and insure the closing of the groove C' and obviate the appearance of any bur on the outside of the welded union as shown in Fig. 6.

From the above description it will be seen that any shape of tine can be welded to a relatively thin piece of metal or to a relatively thick piece of metal by varying the shapes and depths of the grooves so as to make differently shaped isolated surfaces on the face of the metal to which the tine is to be welded, the grooves in every instance being preferably made continuous so that a continuous flange can be formed by upsetting the base of the tine, thereby obviating the removal of any bur to give a finished appearance to the welded union.

What I claim is:—

1. The process of electrically welding parts to form objects of angle or T-shapes, which consists in forming in the surface of one part a continuous groove to reduce the superficial area of such part at the point of intended weld to form an isolated surface or lug, placing the butt of the other part on said isolated surface or lug, passing a welding current through said parts and simultaneously therewith forcing them together to complete the weld then continuing to force the pieces of metal together while in a heated condition so as to form a continuous flange which rests upon the surface of the first named part adjacent the point of welded union, and interrupting the flow of current as soon as the two abutting surfaces have formed a weld union.

2. The process of electrically welding the butt end of an elongated piece of metal to the broad flat surface of another piece of metal, which consists in forming in the broad flat surface of the other piece of metal a continuous groove to reduce the superficial area of such part at the point of intended weld to form an isolated surface or lug, placing the butt of the elongated piece of metal on said isolated surface or lug, passing a welding current through said parts and simultaneously therewith forcing them together to complete the weld, then continuing to force the pieces of metal together while in a heated condition so as to form a continuous flange at the point of welded union, and interrupting the flow of current as soon as the two abutting surfaces have formed a weld union.

3. The process of electrically welding parts to form objects of angle or T-shapes, which consists in forming in the surface of one part a continuous groove so as to form an isolated surface or lug, the under surface of said part beneath said isolated surface or lug being provided with a recess which together with said continuous groove reduces the conductivity of the isolated surface or lug with the adjacent metal, placing the butt of the other part on said isolated surface or lug, passing a welding current through said parts and simultaneously therewith forcing them together to complete the weld, then continuing to force the pieces of metal together while in a heated condition so as to form a continuous flange at the point of welded union, and interrupting the flow of current as soon as the two abutting surfaces have formed a weld union.

In testimony whereof I have signed this specification in the presence of two subscribing witnesses.

MAURICE LACHMAN.

Witnesses:
 LEO J. MATTY,
 FRANK E. RAFFMAN.